(12) United States Patent
Makarov et al.

(10) Patent No.: US 9,058,472 B1
(45) Date of Patent: Jun. 16, 2015

(54) SYSTEM AND METHOD OF APPLYING ACCESS RULES TO FILES TRANSMITTED BETWEEN COMPUTERS

(71) Applicant: Kaspersky Lab ZAO, Moscow (RU)

(72) Inventors: Alexander N. Makarov, Moscow (RU); Vladimir V. Strogov, Moscow (RU); Evgeniya P. Kirikova, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/209,210

(22) Filed: Mar. 13, 2014

(30) Foreign Application Priority Data

Dec. 5, 2013 (RU) .................................. 2013153765

(51) Int. Cl.
 *G06F 21/00* (2013.01)
 *G06F 21/30* (2013.01)
(52) U.S. Cl.
 CPC ...................................... *G06F 21/30* (2013.01)
(58) Field of Classification Search
 CPC .................................. G06F 21/00; H04L 9/00
 USPC ............................................................ 726/1
 See application file for complete search history.

(56) References Cited

U.S. PATENT DOCUMENTS

| | | | |
|---|---|---|---|
| 7,093,250 B1 * | 8/2006 | Rector | 718/100 |
| 7,681,034 B1 | 3/2010 | Lee et al. | |
| 8,365,252 B2 * | 1/2013 | Mahaffey et al. | 726/3 |
| 8,732,800 B1 * | 5/2014 | Askew | 726/4 |
| 2007/0101400 A1 | 5/2007 | Freeman et al. | |
| 2007/0156659 A1 | 7/2007 | Lim | |
| 2009/0249436 A1 | 10/2009 | Coles et al. | |
| 2010/0242082 A1 * | 9/2010 | Keene et al. | 726/1 |
| 2011/0040964 A1 | 2/2011 | Nussbaum et al. | |
| 2011/0162040 A1 * | 6/2011 | Stephens | 726/1 |
| 2011/0302310 A1 * | 12/2011 | Diachina et al. | 709/225 |

FOREIGN PATENT DOCUMENTS

WO 2012016091 A2 2/2012

* cited by examiner

*Primary Examiner* — Kambiz Zand
*Assistant Examiner* — Thanh Le
(74) *Attorney, Agent, or Firm* — Arent Fox LLP; Michael Fainberg

(57) ABSTRACT

Disclosed are systems and methods for providing access to computer files, including receiving, by a hardware processor, from a remote computer, a request to access a file; determining one or more parameters of at least one of the requested file, the remote computer and a user of the remote computer; determining, based on the one or more parameters, access rules for the requested file, wherein the access rules specify at least encryption requirements for the requested file, and applying, by the hardware processor, the access rules to the requested file.

25 Claims, 5 Drawing Sheets

SYSTEM AND METHOD OF APPLYING ACCESS RULES TO FILES TRANSMITTED BETWEEN COMPUTERS

CROSS-REFERENCE TO RELATED APPLICATIONS

This application claims benefit of priority under 35 U.S.C. 119(a)-(d) to a Russian Application No. 2013153765 filed on Dec. 5, 2013, which is incorporated by reference herein.

TECHNICAL FIELD

The disclosure relates generally to the field of computer security and, more specifically, to systems, method and computer program products for protecting computers and data against unauthorized access by applying access rules to files transmitted between computers.

BACKGROUND

The demands for information security of computer devices connected to corporate networks are constantly growing. Theft and loss of data from corporate networks are on the rise, and the resulting financial losses inflict substantial harm to businesses. Due to vulnerabilities in the software and the human factor, data transmitted in a seemingly secure manner on a corporate network can be intercepted by hackers. Therefore, it is desirable to encrypt data transmitted between corporate workstations, notebooks and mobile devices.

The classic system for encryption of files and contents of the directories on a computer operates in accordance with encryption policies. Generally, these policies determine the sets of files that must be encrypted and the files that do not require encryption. In such a system, the most vulnerable and critical files (such as files containing confidential information whose loss is undesirable to its owner) on a disk are present in encrypted form. In corporate networks it is often possible to gain access by means of one computer on the network to the files of another computer. Despite the convenience of exchanging data between computers on the network, such a method has certain inadequacies in regard to protecting the data being transmitted—the files are transmitted in unencrypted form. To solve this problem, an encrypted data transmission channel is used or the files are transmitted in encrypted form.

Existing data encryption systems provide for a secure exchange of data between computers with the use of encryption methods, but this entails an additional computing burden on the processor of the user device. Another drawback of existing data encryption systems is a lack of proper checking of the level of trust of the party requesting access to important files. Thus, the need arises for a solution that increases the security of data transmission on a corporate network without unduly increasing computing burdens on the user devices.

SUMMARY

The present invention relates to systems, methods and computer program products for protecting computer equipment and data of end users against unauthorized access.

According to an aspect, a method for providing access to computer files includes receiving, by a hardware processor, from a remote computer, a request to access a file; determining one or more parameters of the requested file, the remote computer and a user of the remote computer; determining, based on the one or more parameters, access rules for the requested file, wherein the access rules specify at least encryption requirements for the requested file; and applying, by the hardware processor, the access rules to the requested file.

According to another aspect, a system for providing access to computer files includes a hardware processor configured to receive, from a remote computer, a request to access a file; determine one or more parameters of the requested file, the remote computer and a user of the remote computer; determine, based on the one or more parameters, access rules for the requested file, wherein the access rules specify at least encryption requirements for the requested file; and apply the access rules to the requested file.

According to yet another aspect, a computer program product, stored on a non-transitory computer-readable storage medium, includes computer-executable instructions for providing access to computer files, including instructions for receiving, from a remote computer, a request to access a file; determining one or more parameters of the requested file, the remote computer and a user of the remote computer; determining, based on the one or more parameters, access rules for the requested file, wherein the access rules specify at least encryption requirements for the requested file; and applying the access rules to the requested file.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Example aspects are described herein in the context of a system, method and computer program product for protecting computer equipment and data from unauthorized access. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1A:
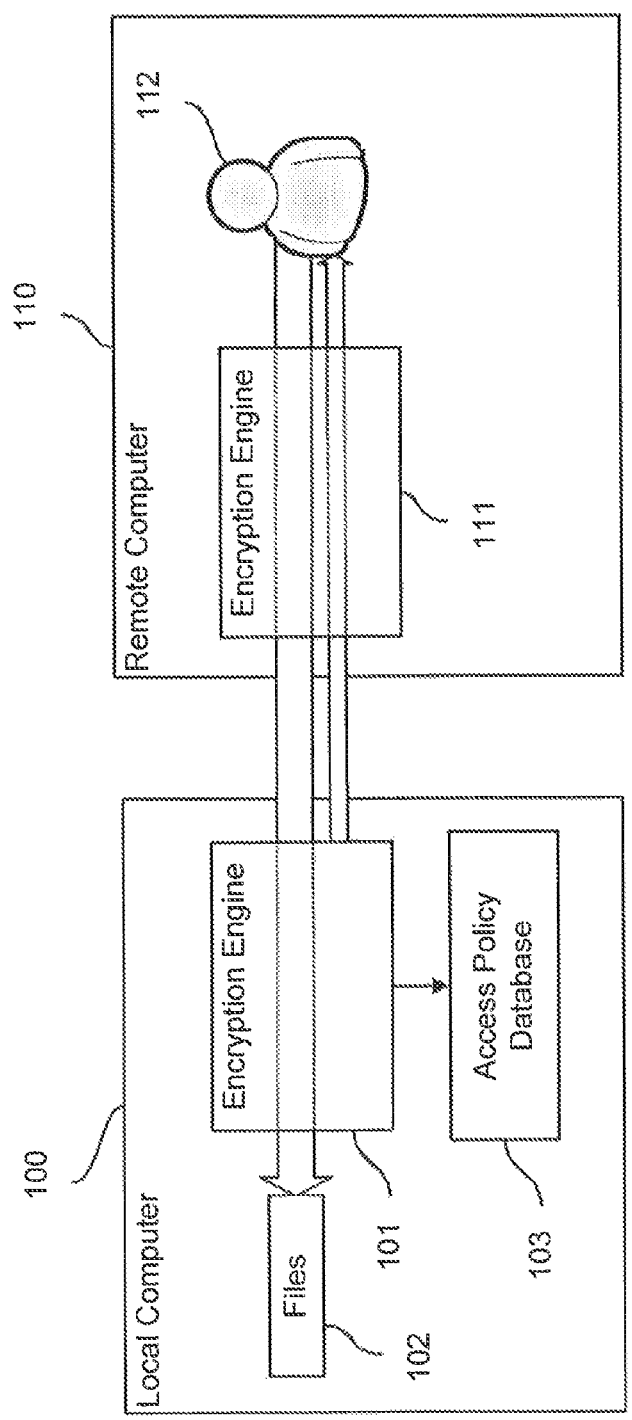
FIG. 1A shows an aspect of an example system for protecting computer equipment and data against unauthorized access.

FIG. 1A shows an aspect of an example system for protecting computer equipment and data from unauthorized access. The system includes a local computer 100 and a remote computer 110. The local computer 100 may include an encryption engine 101, which serves to intercept requests to obtain access to files 102 of the local computer 100 arriving from a user 112 of the remote computer 110, and also to ascertain the parameters of the following objects: the user 112 of the remote computer 110, the file being requested, the remote computer 110, etc.

In one aspect, the parameters of the user 112 of the remote computer 110 may include, but not limited to, user account rights and user's role in the company (e.g., administrator, security officer, accountant, programmer, etc). In another aspect, the file parameters may include, but not limited to: an indicator of whether or not the file is encrypted; the file type (such as text with extension "txt", text with extension "doc"); the hash sum of the file; and file attributes. In yet another aspect, the parameters of the remote computer 110 may include, but not limited to: indicators determining for each of the disks whether or not the disk is encrypted; the security level; the type of disk encryption—file level or full disk encryption. In one aspect, the security level may take on discrete values and depend on the date of the last updating of the antivirus database, the presence of unpatched vulnerabilities on the computer, the date of the last antivirus check and the result of this check (for example, the number of malicious programs neutralized, i.e., repaired or removed programs, the number of files infected, etc.), and also the list of installed applications. For example, the security level can be expressed in a percent, where 100% represents the highest level of security, in which the latest update of the antivirus database has been installed on the computer, there is no vulnerabilities, and no file has been infected. By the same token, 0% represents the opposite situation, in which the antivirus database is outdated, there are numerous vulnerabilities and infected files.

The encryption engine 101 of the local computer 100 may be also operable to transmit the established file access rules to the encryption engine 111 of the remote computer 110. The encryption engine 111 of the remote computer 110 is designed to intercept the opening of files 102 by the user 112 of the remote computer 110, and also to apply file access rules to files of the local computer 100 depending on the established parameters of the objects. In one aspect, these access rules may include, but not limited to: prohibiting access, granting transparent access to an encrypted file (i.e., the file will be decrypted and presented to the user 112 in clear text), or granting access to ciphertext.

The local computer 100 also includes a database of access policies 103, connected to the encryption engine 101 and containing access rules to the files 102 of the local computer 100 for the remote computer 110 depending on the parameters of the objects.

In one aspect, the encryption engine 111 of the remote computer 110 may additionally provide the parameters of the remote computer 110 and the user 112 of the remote computer 110 to the encryption engine 101 of the local computer 100. The user parameters may include, for example, the user's account rights on the remote computer 110.

Figure 1B:
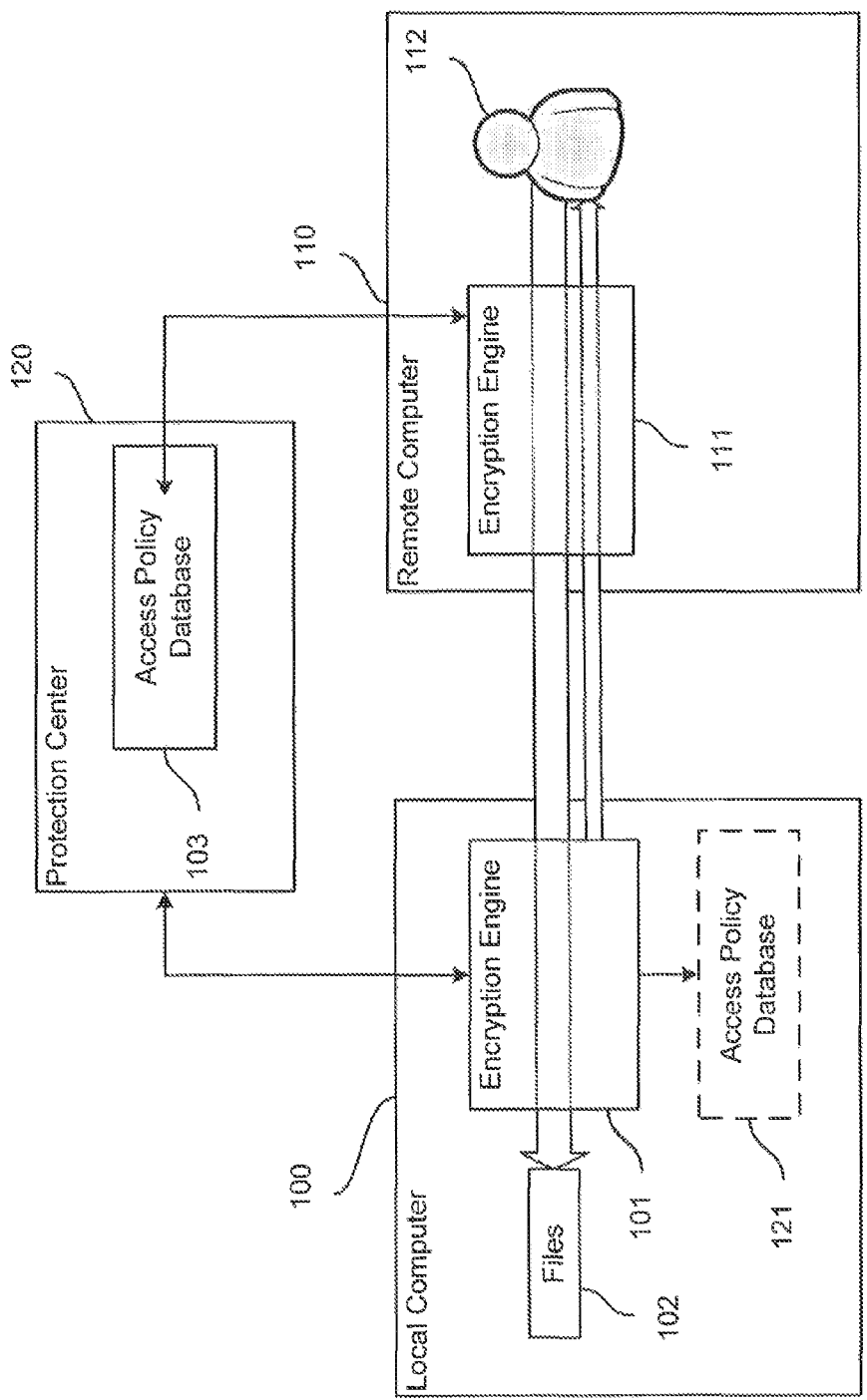
FIG. 1B shows another aspect of an example system for protecting computer equipment and data against unauthorized access.

FIG. 1B shows another aspect of an example system for protecting computer equipment and data from unauthorized access. In this particular aspect, the system contains all the elements presented above in FIG. 1A, and may also include a protection center 120, connected to the encryption engines 101, 111 of the local and remote computers 100, 110, respectively. In this aspect, the protection center 120 serves to designate the access policies, and also to exchange file encryption keys of the local computer 100 with the local and remote computers 100, 110. In this aspect, the protection center 120 may contain a database of access policies 103, as described above. The encryption engine 101 may consult the database of access policies 103 via the protection center 120. In another aspect, the system may additionally contain an auxiliary database of access policies 121, connected to the encryption engine 101 and designed to store the most requested access policies from the database 103. In a particular aspect, the database of access policies 103 may be further operable to store the parameters of the objects.

Figure 2:
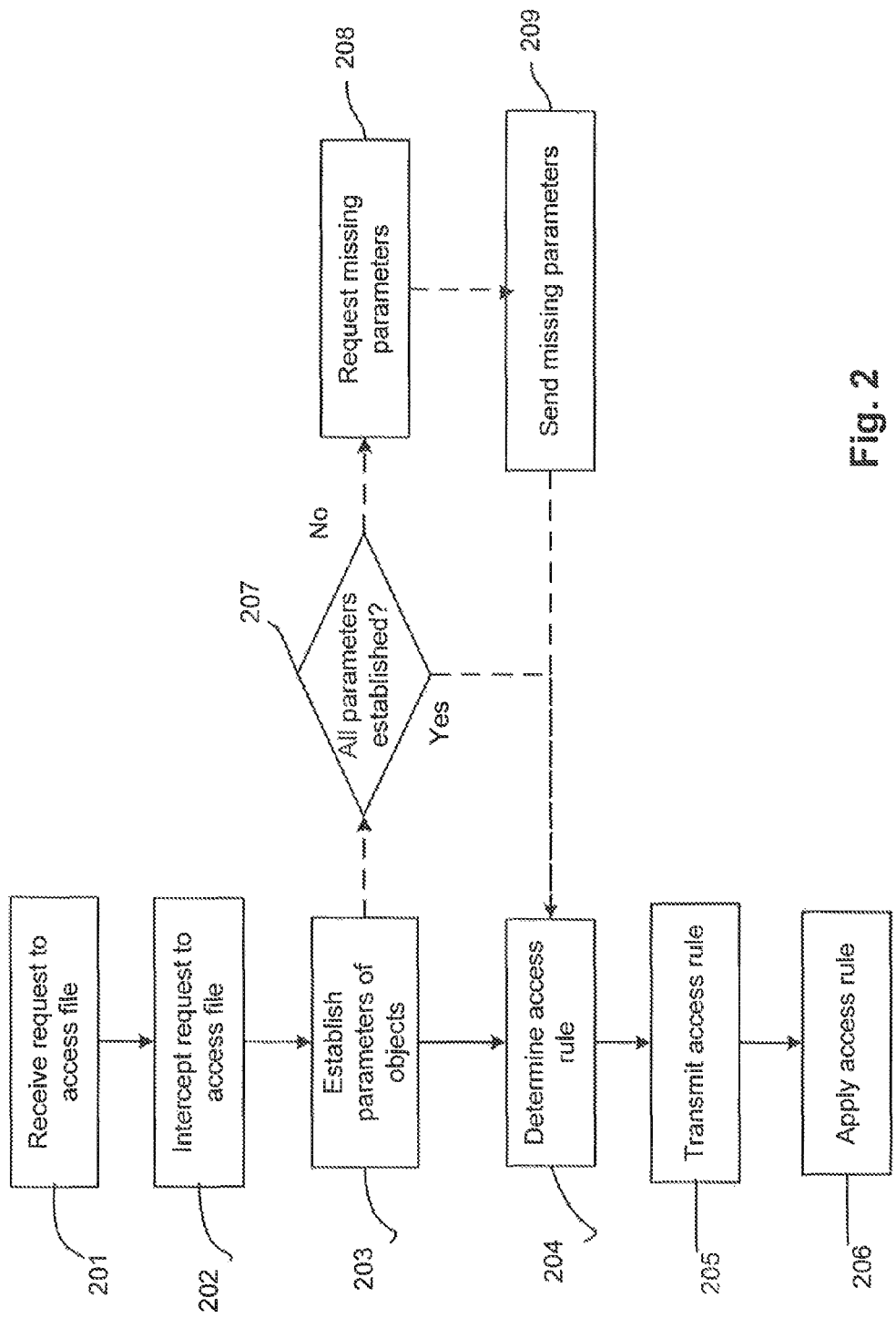
FIG. 2 shows an aspect of an example method for protecting computer equipment and data against unauthorized access.

FIG. 2 shows a particular aspect of the method of implementing the present invention in the context of the system shown in FIG. 1A. In a first step 201, the user 112 of the remote computer 110 requests access to a file 102 (for example, it tries to open, copy, or alter a file) of the local computer 100. In step 202, the encryption engine 101 of the local computer 100 intercepts the request of the user 112 to obtain access to the file. In the next step 203, the encryption engine 101 of the local computer 100 establishes the parameters of the objects, such as, for example, the user 112 of the remote computer 110, the file being requested, the remote computer 110. The next step will be 204, in which the encryption engine 101 of the local computer 100 in accordance with the established parameters of the objects determines the access rule by means of the access policy database 103. In step 205, the encryption engine 101 transmits this rule to the encryption engine 111 of the remote computer 110. As a result, in step 206, the encryption engine 111 of the remote computer 110 applies the obtained access rule to the file being requested 102 of the local computer 100. The procedure for applying the access rules, to be performed in step 206, will be disclosed in detail below in the description for FIG. 3.

In one particular aspect, following step 203 there can occur an additional step 207, in which the encryption engine 101 of the local computer 100 checks whether all necessary parameters have been established. In certain situations, some of the parameters cannot be established on the local computer 100, although they can be established on the remote computer 110. For example, the encryption engine 101 of the local computer 100 cannot determine the account rights of the remote computer 110 if the remote computer 110 itself does not furnish this information. Thus, if all necessary parameters have been established in step 207, the flow chart returns to step 204. Otherwise, in step 208, the encryption engine 101 of the local computer 100 requests the missing parameters from the encryption engine 111 of the remote computer 110, which sends them back in the next step 209. As a result, the flow chart returns to step 204, as described above in detail.

Table 1 below presents an example of the content of the database of access policies. In one aspect, the database of access policies can constitute a table, the rows of which contain the access rules. For each rule there are defined the conditions of its occurrence and the action performed by the encryption engine 101 of the local computer 100 when this rule is selected. The rules in the table are kept in order of decreasing priority, so that if several rules fall under a specified condition, the rule with the highest priority will be selected.

TABLE 1

| No | Condition | Action |
|---|---|---|
| 1 | Hash sum on the black list | Prohibit access |
| 2 | Hash sum is found on the list of mandatory encryption files | Provide cipher text |
| 3 | a. File contains the "system" attribute, b. security level >90%, c. user account rights - personal computer (PC) administrator | Provide cipher text |
| 4 | File contains the "system" attribute | Prohibit access |
| 5 | File contains the "read only" attribute, the system disk of the remote PC is encrypted | Provide cipher text |
| 6 | File contains the "read only" attribute | Prohibit access |

In Table 1, the first rule has the highest priority and the last rule the lowest. In a particular aspect, the database of access policies may additionally contain black lists of hash sums of files which are critically important or confidential files. Access to such files by the user 112 of the remote computer 110 will be prohibited according to the first rule of Table 1. In yet another aspect, the database of access policies may contain a list of mandatory encryption files, which keeps the hash sums of files that are kept in encrypted form on the local computer 100. According to rule No. 2 of Table 1, such files will be furnished to the remote computer 110 in encrypted form.

In the present example, if a file is a system file and at the same time the security level of the remote computer 110 is greater than 90%, and also if the user 112 of this computer has administrator rights, then the file will be presented to the remote computer 110 in the form of cipher text. However, if even one of conditions "a" to "c" is not fulfilled, this rule will not be used. For example, if a particular file is also a system file, but the security level of the remote computer 110 is equal to 85%, the more harsh rule No. 4 will be applied, whereby access to the file will be prohibited.

Similarly, if the file contains the "read only" attribute, it comes under rule No. 5 if it is additionally known that the system disk on the remote computer 110 is encrypted (thus increasing the security of the computer). Otherwise, if the system disk on the remote computer 110 is not encrypted, the next lower priority rule No. 6 will be carried out.

In one aspect, if none of conditions 1-6 is fulfilled, a default rule may be applied, such as allowing access to the file.

In another aspect, the access policies may be designated and changed periodically by the administrator of the local computer 100. In yet another aspect, in step 204 the encryption engine 101 of the local computer 100 can allow the user 112 of the local computer 100 to select the access rule manually.

In yet another aspect, the access policies may be changed based on various additional conditions, such as, for example, the time of day and the account rights of the user 112 of the local computer 100. For example, during business hours one set of access policies may be used, and during nonbusiness hours another set.

In a particular aspect in which the system shown in FIG. 1B is used, in step 204 the encryption engine 101 requests access rules from the protection center 120, which in turn provides the access rules to the encryption engine 101 according to the database of access policies 103. In another sample aspect, in step 208 the encryption engine 101 of the local computer 100 may request the missing parameters of the objects in the database 103, and if there are none in the database 103 either, the protection center 120 in turn may request them from the encryption engine 111 of the remote computer 110 and keeps them in the database 103. In yet another aspect, some of the database of access policies 103 may be kept in an auxiliary database 121. In this case, the encryption engine 101 will determine the access rules with the aid of the auxiliary database 121.

Figure 3:
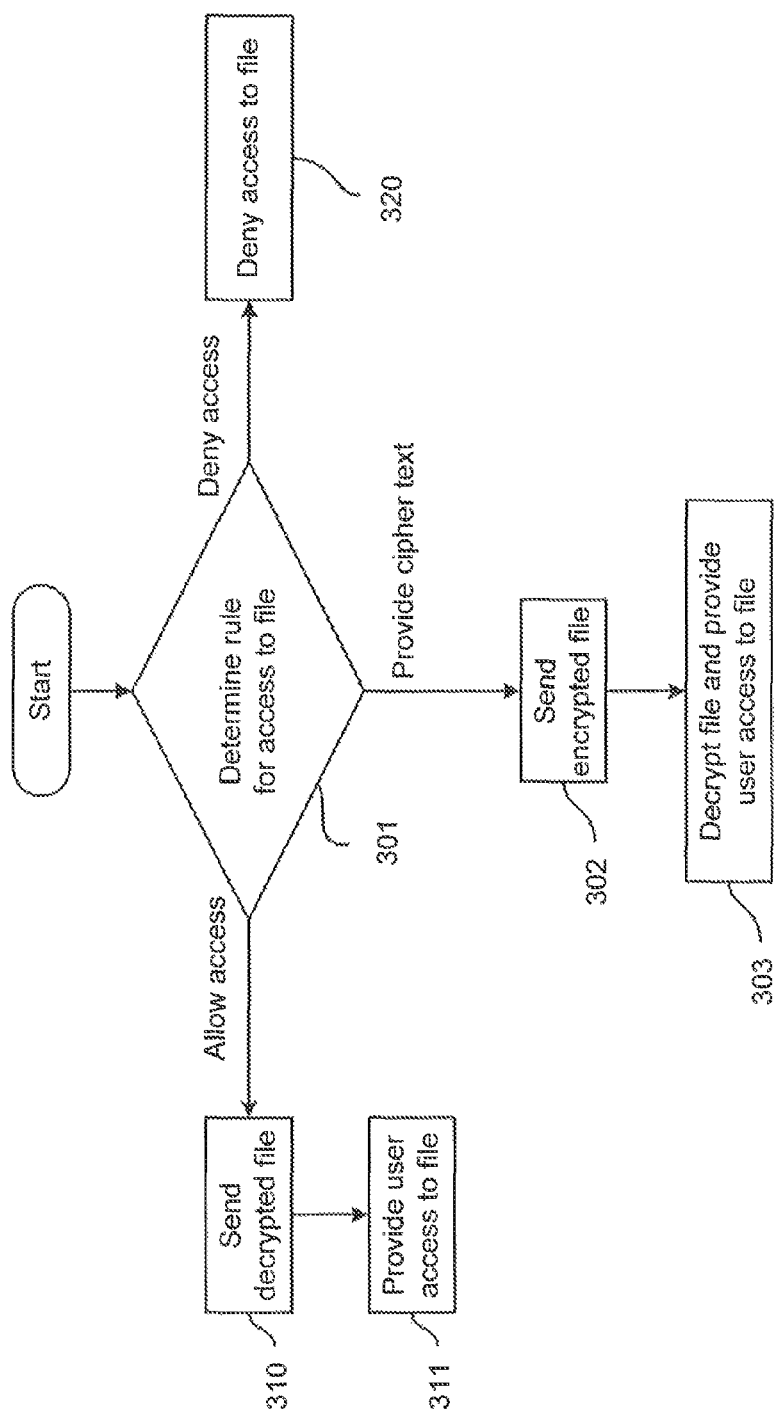
FIG. 3 shows a sample of the application of rules of access to computer files.

FIG. 3 shows an example of the use of rules of access to the files of a computer. In step 301 the rule for access to the file being requested is determined. If the access rule is prohibitory, then in step 320 access to the file is blocked. In one aspect, the user 112 of the remote computer 110 may be sent a message as to the reason for prohibiting access. In another aspect, the user 112 of the remote computer 110 may be asked to enter a password for access to the file.

If the selected access rule allows the file to be presented in decrypted form, the next step will be 310, in which the encryption engine 101 of the local computer 100 sends the file to the encryption engine 111 of the remote computer 110, which in turn presents it to the user 112 of the computer in step 311.

If an access rule is selected whereby the file should be presented in the form of cipher text, the flow chart continues in step 302. If the file was originally encrypted, it is sent on to the remote computer 110. But if the file was not encrypted, the encryption engine 101 of the local computer 100 may encrypt the file before sending it to the remote computer 110. In step 303, the remote computer 110 receives the file, decrypts it and presents it to the user 112. In a particular aspect, a symmetrical encryption may be used for encrypting the files, in which the encryption engines 101, 111 of the local and remote computers 100, 110 previously exchange the key that will be used for both encryption and decryption of the data. In another example aspect, a public-key encryption scheme may be used, in which the encryption engines 101, 111 of the local and remote computers 100, 110 have one public key and one private key each. Thus, for example, the encryption engine 101 of the local computer 100 can encrypt files with the public key of the encryption engine 111 of the remote computer 110. Thus, such a file can only be decrypted by the remote computer 110 using its private key.

In yet another aspect, the protection center 120 can participate in the file transfer process. For example, the encryption engine 101 of the local computer 100 an encrypt a file by means of a certain "file key", which is then encrypted by the public key of the protection center 120 and placed in the metadata of the file. Thus, the encryption engine 111 of the remote computer 110 can extract the encrypted "file key" from the metadata of the file and send it to the protection center 120, which decrypts it by its private key and sends it back to the remote computer 110. In a particular aspect, the protection center 120 may not decrypt the "file key", even if the file should be presented in open form according to the access rule. Such an outcome is possible, for example, if the remote computer 110 has been hacked and information about the hacking has succeeded in reaching the protection center 120, but the database of access policies 103 was not updated. In a particular aspect, the protection center 120 may contain a copy of the database of access policies 121 and use it for an additional checking of the rules of access of the remote computer 110 to the files of the local computer 100. For example, two possible access rules may be determined for the file being requested: to provide the decrypted file during business hours; to provide cipher text the rest of the time. Thus, if the file was sent by the encryption engine 101 at the end of the work day, but on account of the large size of the file it was already outside business hours when the remote computer 110 received it, the protection center 120 will not provide the decrypted "file key" to the encryption engine 111, since the rule for access to the file has changed.

Figure 4:
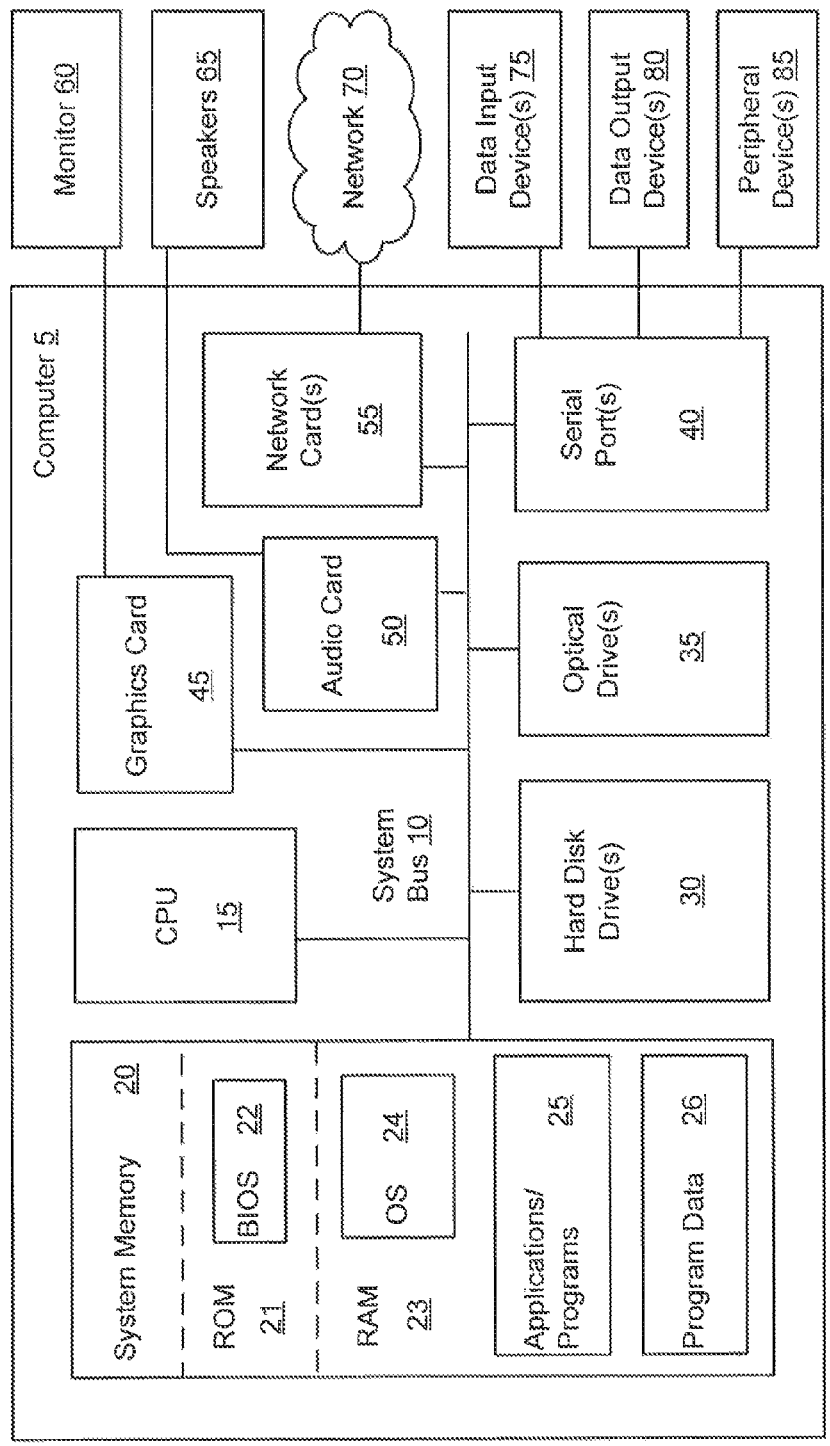
FIG. 4 shows an example of a general-purpose computer system on which systems and methods for protecting computer equipment and data against unauthorized access may be implemented.

FIG. 4 depicts an example configuration of a general-purpose computer 5 that can be used to implement the disclosed system and methods for protecting computer equipment and data from unauthorized access. The computer system 5 may include, but not limited to, a personal computer, a notebook, tablet computer, a smart phone, a network server, a router, or other type of computing device. As shown, computer system 5 may include one or more hardware processors 15, system memory 20, one or more hard disk drive(s) 30, optical drive(s) 35, serial port(s) 40, graphics card 45, audio card 50 and network Card/s 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, VViFi, GSM, Bluetooth or other wired, wireless, or cellular network interface for connecting computer system 5 to network 70, such as the Internet.

In various aspects, the systems and methods described herein nay be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of engines. The term "engines" as used herein refers to a real-world device, component, or arrangement of components implemented using hardware, such as by an application specific integrated circuit (ASIC) or field-programmable gate array (FPGA \, for example, or as a combination of hardware and software, such as by a microprocessor system and a set of instructions to implement the engine's functionality, which (while being executed) transform the microprocessor system into a special-purpose device. An engine may also be implemented as a combination of the two, with certain functions facilitated by hardware alone, and other functions facilitated by a combination of hardware and software. In certain implementations, at least a portion, and in some cases, all, of an engine may be executed on the processor of a general purpose computer (such as the one described in greater detail in FIG. 4 above). Accordingly, each engine can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known components referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for providing access to computer files, the method comprising:
receiving, by a hardware processor, from a remote computer, a request to access a file;
in response to receiving the request to access the file from the remote computer, determining one or more parameters of the requested file, the remote computer and a user of the remote computer, wherein parameters of the remote computer are determined based on information directly obtained from the remote computer including one or more of an indicator of whether the remote computer's disk is encrypted or unencrypted, type of disk encryption, and the remote computer's security level;

determining, based on the one or more parameters, access rules for the requested file, wherein the access rules specify at least encryption requirements for the requested file; and applying, by the hardware processor, the access rules to the requested file.

2. The method of claim 1, wherein parameters of the user of the remote computer include one or more of user account rights and a user's role in a company.

3. The method of claim 1, wherein parameters of the requested file include one or more of an indicator of whether the file is encrypted or unencrypted, a file type, a hash sum of the file and one or more attributes of the file.

4. The method of claim 1, wherein the type of disk encryption includes one of a Full Disk Encryption (FOE) and a File-Level Encryption (FIE).

5. The method of claim 1, wherein the remote computer's security level is determined based on one or more of a date of last update of an antivirus database, date of last antivirus check, presence of unpatched vulnerabilities, a number of detected malicious programs, and a number of repaired or removed malicious programs.

6. The method of claim 1, wherein the access rules are applied in order based on a priority of each access rule, and with access rules having highest priority being applied first.

7. The method of claim 1, wherein the access rules are based on one of a time of a day, and a user account policy.

8. The method of claim 1, wherein the access rules include one or more of a rule denying access to the file, a rule granting access to the encrypted file as cleartext, and a rule granting access to the encrypted file a ciphertext.

9. The method of claim 1, wherein determining the access rules for the requested file is further based on a time of the request being received and an amount of time for transferring the requested file to the remote computer.

10. A system for providing access to computer files, the system comprising:

a hardware processor configured to:

receive, from a remote computer, a request to access a file;

in response to receiving the request to access the file from the remote computer, determine one or more parameters of the requested file, the remote computer and a user of the remote computer, wherein parameters of the remote computer are determined based on information directly obtained from the remote computer including one or more of an indicator of whether the remote computer's disk is encrypted or unencrypted, type of disk encryption, and the remote computer's security level;

determine, based on the one or more parameters, access rules for the requested file, wherein the access rules specify at least encryption requirements for the requested file; and apply the access rules to the requested file.

11. The system of claim 10, wherein parameters of the user of the remote computer include one or more of user account rights and a user's role in a company.

12. The system of claim 10, wherein parameters of the requested file include one or more of an indicator of whether the file is encrypted or unencrypted, a file type, a hash sum of the file and one or more attributes of the file.

13. The system of claim 10, wherein the type of disk encryption includes one of a Full Disk Encryption (FOE) and a File-Level Encryption (FLE).

14. The system of claim 10, wherein the remote computer's security level is determined based on one or more of a date of last update of an antivirus database, date of last antivirus check, and presence of unpatched vulnerabilities, a number of detected malicious programs, and a number of repaired or removed malicious programs.

15. The system of claim 10, wherein the access rules are applied in order based on a priority of each access rule, and with access rules having highest priority being applied first.

16. The system of claim 10, wherein the access rules are based on one of a time of a day, and a user account policy.

17. The system of claim 10, wherein the access rules are based on one of a time of a day, and a user account policy.

18. A computer program product stored on a non-transitory computer-readable storage medium, the computer program product comprising computer-executable instructions for providing access to computer files, including instructions for:

receiving, from a remote computer, a request to access a file;

in response to receiving the request to access the file from the remote computer, determining one or more parameters of the requested file, the remote computer and a user of the remote computer, wherein parameters of the remote computer are determined based on information directly obtained from the remote computer including one or more of an indicator of whether the remote computer's disk is encrypted or unencrypted, type of disk encryption, and the remote computer's security level;

determining, based on the one or more parameters, access rules for the requested file, wherein the access rules specify at least encryption requirements for the requested file; and applying the access rules to the requested file.

19. The product of claim 18, wherein parameters of the user of the remote computer include one or more of user account rights and a user's role in a company.

20. The product of claim 18, wherein parameters of the requested file include one or more of an indicator of whether the file is encrypted or unencrypted, a file type, a hash sum of the file and one or more attributes of the file.

21. The product of claim 18, wherein the type of disk encryption includes one of a Full Disk Encryption (FOE) and a File-Level Encryption (FLE).

22. The product of claim 18, wherein the remote computer's security level is determined based on one or more of a date of last update of an antivirus database, date of last antivirus check, and presence of unpatched vulnerabilities, a number of detected malicious programs, and a number of repaired or removed malicious programs.

23. The product of claim 18, wherein the access rules are applied in order based on a priority of each access rule, and with access rules having highest priority being applied first.

24. The product of claim 18, wherein the access rules are based on one of a time of a day, and a user account policy.

25. The product of claim 18, wherein the access rules are based on one of a time of a day, and a user account policy.

* * * * *